United States Patent [19]
Kuthy

[11] Patent Number: 5,331,761
[45] Date of Patent: Jul. 26, 1994

[54] COMBINATION FISHING TACKLE BOX AND FISHING POLE HOLDER DEVICE

[76] Inventor: Louis Kuthy, 15750 Los Angeles Ave., #104, Moorpark, Calif. 93021

[21] Appl. No.: 60,670

[22] Filed: May 13, 1993

[51] Int. Cl.⁵ .................................... A01K 97/10
[52] U.S. Cl. .................................... 43/21.2; 43/54.1; 206/315.11; 206/216
[58] Field of Search ............ 43/21.2, 54.1; 206/315.11, 216

[56] References Cited

U.S. PATENT DOCUMENTS

| | | | |
|---|---|---|---|
| 2,236,070 | 3/1941 | Rohrdanz | 43/21.2 |
| 2,314,747 | 3/1943 | White | 43/21.2 |
| 2,576,624 | 11/1951 | Miller | 43/21.2 |
| 2,724,569 | 11/1955 | Licata | 43/21.2 |
| 2,803,387 | 8/1957 | Pearce | 43/21.2 |
| 2,917,258 | 12/1959 | Furey | 43/21.2 |
| 2,995,855 | 8/1961 | Bell | 43/21.2 |
| 3,154,274 | 10/1964 | Hillcourt | 43/21.2 |
| 3,246,865 | 3/1966 | Latimer | 43/21.2 |
| 3,327,978 | 6/1967 | Gates | 43/21.2 |
| 3,389,489 | 6/1968 | Burns | 43/21.2 |
| 3,543,432 | 12/1970 | Gates | 43/21.2 |
| 3,555,719 | 1/1971 | Butler | 43/21.2 |
| 3,571,964 | 3/1971 | Bogathy | 43/21.2 |
| 3,603,019 | 9/1971 | Smeltzer | 43/21.2 |
| 3,659,369 | 5/1972 | Hermanson | 43/21.2 |
| 3,667,708 | 6/1972 | Smeltzer | 43/21.2 |
| 4,014,128 | 3/1977 | Hrdlicka | 43/21.2 |
| 4,095,364 | 6/1978 | Prine | 43/21.2 |
| 4,106,811 | 8/1978 | Hernandez | 43/21.2 |
| 4,150,506 | 4/1979 | McGinnis | 43/21.2 |
| 4,257,181 | 3/1981 | Cooper | 43/21.2 |
| 4,323,181 | 4/1982 | Spasoff | 43/21.2 |
| 4,375,731 | 3/1983 | Budd | 43/21.2 |
| 4,650,146 | 3/1987 | Duke | 43/21.2 |
| 4,682,438 | 7/1987 | Arrow | 43/21.2 |
| 4,841,660 | 6/1989 | James | 43/21.2 |
| 4,845,881 | 6/1989 | Ward | 43/21.2 |
| 5,125,615 | 6/1992 | McGuire | 43/21.2 |

*Primary Examiner*—P. Austin Bradley
*Assistant Examiner*—Chuck Y. Mah
*Attorney, Agent, or Firm*—John J. Posta, Jr.

[57] ABSTRACT

The combination fishing tackle box and pole holder includes a box having an interior storage space. The lid is connected to at least one fishing pole holder which is in the form of a pipe which extends up from the lid top surface at an angle. The pipe has its lower end in the form of a socket which releasably retains the butt end of a fishing pole. The upper portion of the pipe extends up around the pole and has a cutaway portion on the rear side, so that the pole body can be tilted backwardly out of the cutaway portion while retaining the pole butt in the socket, in order to set a hook in a fish caught on the fishing pole line. The box can have one or more carrying handles and the holder can be hinged to the lid top and movable between the raised operative position and a down storage position. The lid can be configured to provide a storage recess for the holder when in the down position.

12 Claims, 2 Drawing Sheets

COMBINATION FISHING TACKLE BOX AND FISHING POLE HOLDER DEVICE

BACKGROUND OF THE INVENTION

1. FIELD OF THE INVENTION

The present invention generally relates to fishing equipment and more particularly to an improved combination device which serves as a fishing tackle box and also an improved fishing pole holder.

2. PRIOR ART

Various types of fishing tackle boxes have been devised, most of which have hinged lids and compartments for the storage of various items of fishing equipment. Various types of fishing pole holders have also been devised, some of which are set forth in U.S. Pat. Nos. such as 2,236,070 and 2,314,747 where a fishing pole is clamped to the rail or other part of a fishing boat. U.S. Pat. No. 4,323,181 discloses a fishing pole holder which is connected to a fisherman's belt, while U.S. Pat. No. 4,650,146 discloses a stand for anchoring a fishing pole into a beach. U.S. Pat. Nos. 4,845,881 and 3,571,964 disclose connecting a fishing pole holder to a bait pail or fish bucket, while U.S. Pat. Nos. 3,543,432 and 3,555,719 disclose holders which clamp a fishing pole rigidly to the outside of a tackle box.

The prior art devices have a number of disadvantages. In most instances, the fishing pole holders are difficult to connect to the fishing poles and to the base supports, whether they be boat gunwhales, seats, fishing pails, etc. Most such holders clamp the fishing pole into a fixed position so that it cannot be easily moved in order to set a hook into a fish which has struck the lure on the end of the fishing line. Moreover, those fishing pole holders which are attached to fishing pails, etc. easily tip the pails over when a fish of any substantial size strikes the lure. In addition, most such holders are complicated, expensive and difficult to assemble and store.

Accordingly, there is a need for a simple, inexpensive and durable fishing pole holder which will permit the fisherman to readily maneuver the fishing pole to set the hook when a fish strikes the lure and which can be combined with the ever present fishing tackle box and can be stored therein in a minimum amount of space. The fishing pole holder-tackle box combination should be constructed so that it is not easily tipped over when a fish of substantial size strikes the lure.

SUMMARY OF THE PRESENT INVENTION

The improved combination fishing tackle-box fishing pole holder device of the present invention satisfies all the foregoing needs. The device is inexpensive, efficient, compact and durable.

The device is substantially as set forth in the Abstract of the Disclosure. Thus, the device includes a fishing tackle box which comprises a flat horizontal bottom and interconnected upraised sides defining a central storage space open at the top of the box, over which is releasably connected a lid with a horizontal top surface, wherein the tackle box and pole holder are preferably made as a unitary integral structure.

The lid top surface has a generally tubular fishing pole holder connected thereto and rising thereabove at an angle. The holder includes a bottom portion in the form of a socket for the butt of the fishing pole and an upper portion having the rear end thereof cut away to permit a fishing pole while in the holder to be tilted back out through the cut-away portion of the holder in order to easily set the hook in a fish which has struck the lure on the line attached to the pole. Preferably, the holder is generally cylindrical.

The holder can be pivotably connected to the lid so as to move between the raised operative position and a lowered storage position, and the lid can be configured to provide a storage recess for the holder. Two or more such holders can be spaced apart and connected to the lid. In one embodiment, the lid is removable from the box and storable therein with the holder attached thereto. This can be accomplished by providing the device with a hinge which has a movable pin. The lid can be inverted before placing it in the box.

Preferably, the holder socket is cut away to provide an upwardly diverging recess on the back of the socket in order to prevent the pole from binding on the socket back wall when the pole is tilted back to set the hook. If desired, the recess can be provided with a spring to bias the pole into the nested forward position.

Further features of the present invention are set forth in the following detailed description and accompanying drawings.

DRAWINGS

DETAILED DESCRIPTION

FIGS. 1, 2, 6 and 7.

Figure 1:
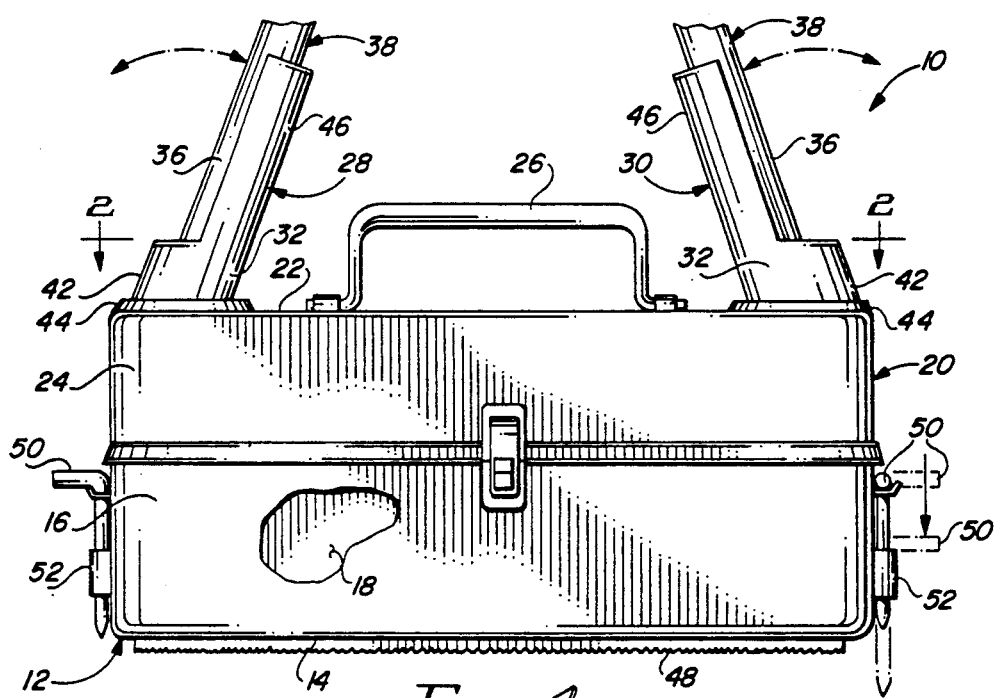
FIG. 1 is a schematic side elevation, partly broken away, of a first preferred embodiment of the improved device of the present invention.
Figure 2:
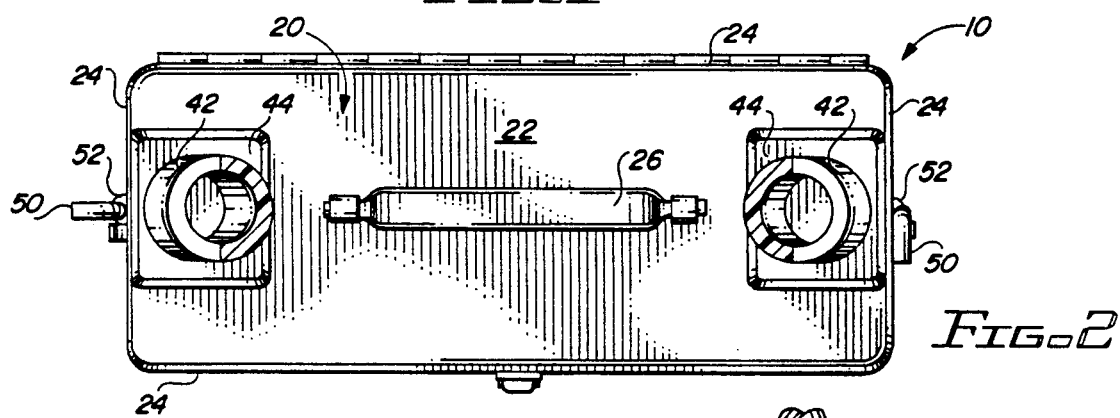
FIG. 2 is a schematic top plan view of the device of FIG. 1, with a portion of the device cut away along the section line 2—2 of FIG. 1.

Now referring more particularly to FIGS. 1 and 2 of the drawings, a first preferred embodiment of the improved combination fishing tackle box-fishing pole holder device of the present invention is schematically set forth therein. Thus, device 10 is shown which comprises a fishing tackle box 12 having a flat horizontal bottom 14 and interconnected vertical sides generally designated 16 and collectively defining a central storage space 18 open at the top and releasably covered by a lid 20. Lid 20 comprises a flat horizontal upper surface 22 with interconnected depending sides 24 resting on and hinged to the upper end of one of sides 16 at a selected location (not shown). Means (not shown) may also be provided for releasably locking lid 20 in the closed position shown in FIG. 1 down over box 12.

Upper surface 22 of lid 20 preferably has a handle 26 connected thereto and projecting upwardly thereover. Handle 26 may be pivotably connected to lid surface 22 so that handle 26 can lie flat thereagainst, if desired.

Figure 5:
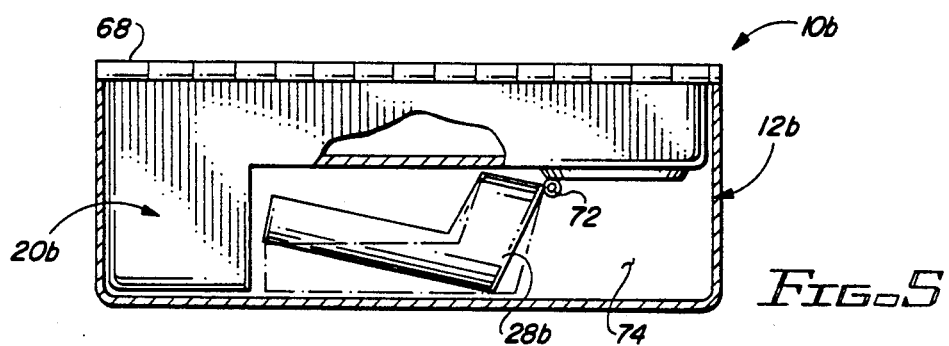
FIG. 5 is a schematic side elevation, partly in section, showing the lid of the device of FIG. 4 inverted and stored within the box of the device of FIG. 4, and with the holder thereof in the stored position.
Figures 6, 7:
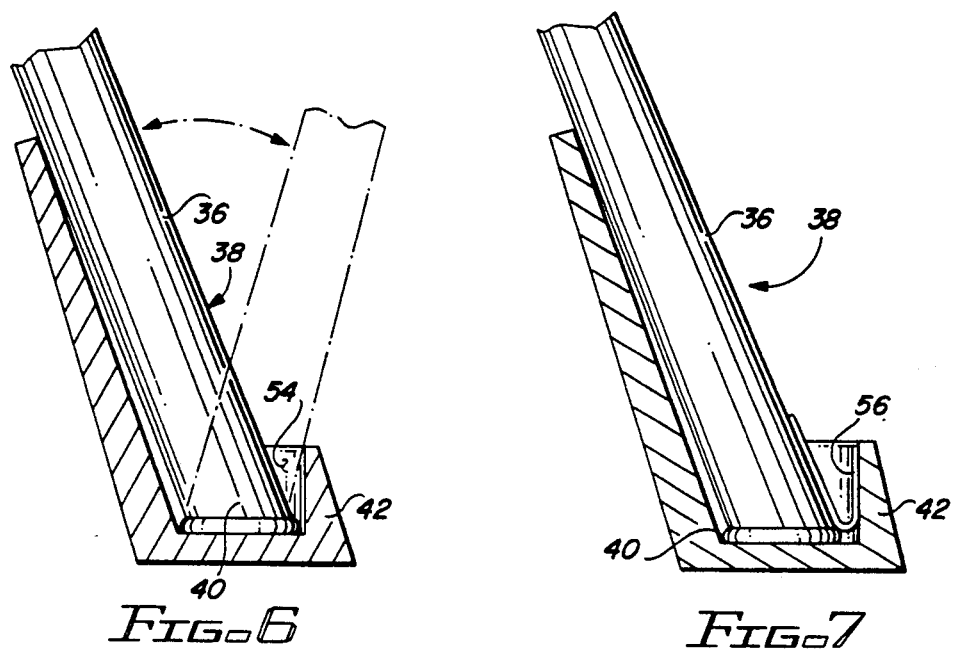
FIG. 6 is an enlarged fragmentary cross-section of one the sockets of FIG. 1 configured to provide an upwardly diverging recess at the back of the socket; and, FIG. 7 is an enlarged fragmentary cross-section of the socket of FIG. 6 showing the recess thereof with a biasing spring installed therein.

Upper surface 22 of lid 20 has a spaced pair of fishing pole holders 28 and 30 connected thereto and extending upwardly therefrom at an angle. Holders 28 and 30 are substantially identical to each other, except they face each other and slope toward each other. They are positioned at opposite ends of surface 22 beyond the centrally located handle 26. Each of holders 28 and 30 comprises a hollow tubular, preferably generally cylindrical pipe 32 tilting up towards the center of surface 22. Pipe 32 has a central generally cylindrical space or bore 34 within which the lower portion 36 of fishing pole 38 is releasably received. The butt end 40 of pole 38 fits into an upraised socket 42 comprising the lower end of pipe 32 and fixedly connected to a mounting plate 44 secured to surface 22, as shown in FIGS. 5 and 6. The portion of pole 38 immediately above butt 40 rests in a semi-cylindrical cradle portion 46 of pipe 52 for each holder 28 and 30. It will be seen that the rear half of portion 46 has been cut away so that each pole 38 can be tilted backwardly very easily while still in its holder, in order to set a hook rapidly in a fish which has struck on a line attached to pole 38.

In order to prevent box 12 from tilting over when a fish strikes the line, as indicated above, bottom 14 can be provided with a non-slip tread 48, and two or more opposite sides 16 of box 12 can bear retractible anchoring spikes 50 disposed vertically in straps or rings 52.

Referring more particularly to FIGS. 6 and 7, FIG. 6 shows in schematic form a preferred configuration for socket 42. Thus, socket 12 is shaped to provide an upwardly diverging recess 54 at its back end which permits pole 38 to be tilted back easily to the position shown in dotted outline without binding against the interior surface of socket 42. In FIG. 7, recess 54 is shown filled with a V-shaped leaf spring 56 which biases pole 38 into the resting nested position against the front of pipe 32.

Device 10 can be made of any suitable material, such as steel, aluminum, plastic, hardwood, ceramic, cermet or the like and can be of any suitable size and shape. Device 10 is inexpensive to make, is durable and simple and performs efficiently as previously described.

FIG. 3.

Figure 3:
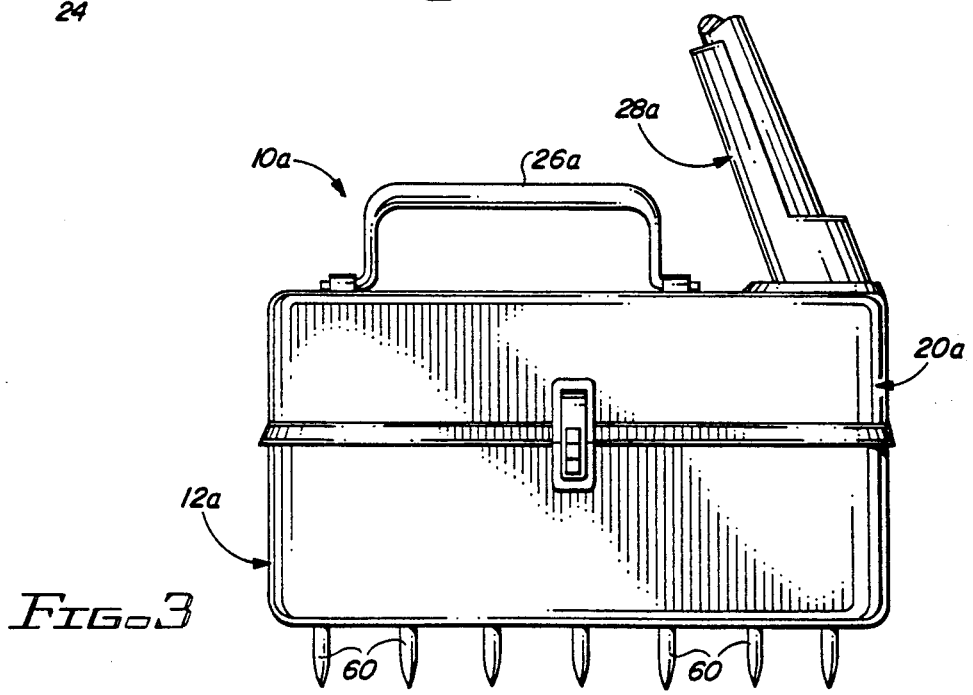
FIG. 3 is a schematic side elevation of a second preferred embodiment of the improved device of the present invention.

A second preferred embodiment of the improved device of the present invention is schematically depicted in FIG. 3. Thus, device 10a is shown. Components thereof which are substantially similar to those of device 10 bear the same numerals but are succeeded by the letter "a".

Device 10a is substantially identical to device 10, except that only one fishing pole holder 28a is present. Moreover, spikes 50 and tread 48 are substituted for by a plurality of fixed spikes 60 depending from the underside of device 10a. Device 10a has substantially the advantages of device 10.

Figure 4:
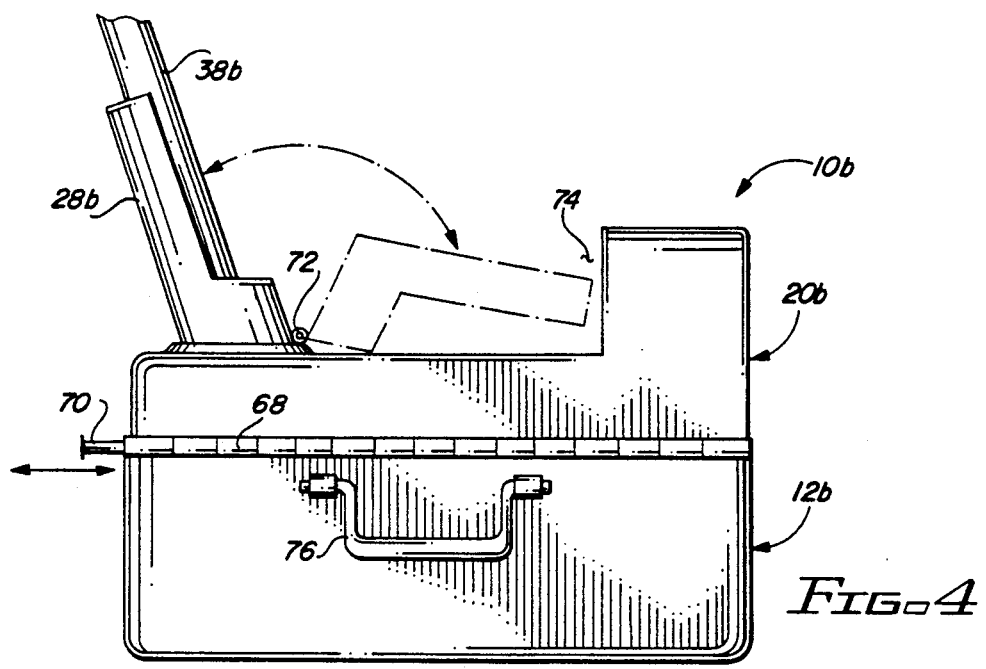
FIG. 4 is a schematic side elevation of a third preferred embodiment of the improved device of the present invention, showing the holder thereof in the operative position in solid outline and in the stored position in dotted outline.

FIGS. 4 and 5.

A third preferred embodiment of the improved device of the present invention is schematically depicted in FIGS. 4 and 5. Thus, device 10b is shown. Components thereof similar to those of device 10 bear the same numerals but are succeeded by the letter "b".

Device 10b is substantially similar to device 10, except as follows:

a) Lid 20b is releasably hinged to box 12b by a hinge 68 with removable hinge pin 70.

b) There is only one fishing pole holder 28b present. It is tilted away from the center of lid 20b, and it is hinged to surface 22b at point 72 so as to rotate between the upraised operative position shown in solid outline and the lowered storage position shown in dotted outline in FIG. 4.

c) Lid 20b is configured to provide a recess 74 for the storage of holder 28b.

d) A pair of handles 76 are secured to opposite sides 24b of box 12b and a top handle is absent.

Lid 20b can be removed from connection to box 12b by removing pin 70. Thereafter, as shown in FIG. 5, lid 20b can be inverted and stored, with holder 28b attached, in space 18b of box 12b. It will be noted that in order for this to be possible, sides 16b are spaced slightly farther apart than are sides 24b. Device 10b has the other advantages of device 10.

Various other modifications, changes, alterations and additions can be made in the improved device of the present invention, its components and their parameters. All such modifications, alterations, changes and additions as are within the scope of the appended claims form part of the present invention.

What is claimed is:

1. An improved combination fishing tackle box and fishing pole holder device, said device comprising, in combination:

a) a fishing tackle box having an interconnected generally horizontal, flat bottom and upstanding sides collectively defining a central, fishing tackle-storing space open at the top, and a lid connected to the upper end of said box for movement between a closed position covering said space and an open position exposing said space, said lid having a generally flat horizontal top surface;

b) a hollow, generally tubular fishing pole holder connected to said upper surface of said lid and extending upwardly therefrom at an angle, said holder having a base socket adapted to receive and releasably retain the butt of a fishing pole and an upper fishing pole-bracing portion connected to said socket, said portion having an upper and a lower side with said upper side being cut away to enable said pole to be tilted away from said holder while retaining said pole base in said socket; and c) wherein said holder slant toward the center of said lid and wherein said cutaway portion of said holder is on the side thereof away from said center of said lid, thereby providing increase stability of said tackle box and holder when a pole is placed therein.

2. The improved device of claim 1 wherein said holder is generally cylindrical and wherein said cutaway portion is semi-cylindrical.

3. The improved device of claim 2 wherein a spaced pair of said holders are connected to said upper surface of said lid.

4. The improved device of claim 1 wherein said box includes anchoring means to releasably secure said box to the ground.

5. The improved device of claim 4 wherein said anchoring means comprises one of ground-engaging spikes and a tread on the lower surface of said bottom of said box.

6. The improved device of claim 1 wherein said fishing pole holder is pivotally connected to said upper surface of said lid for movement between an upraised operative position and a storage position.

7. The improved device of claim 6 wherein said lid is configured to define a storage recess for said pole holder when said pole holder is in said storage position.

8. The improved device of claim 6 wherein said lid is removable from said box and storable therein, while said lid bears said pole holder in a storage position.

9. The improved device of claim 7 wherein said lid is releasably hinged to said box by a removable hinge pin and wherein said lid is inverted after disconnecting it from said box and before inserting it into said box for storage.

10. The improved device of claim 1 wherein at least one of said box and said lid includes at least one carrying handle, wherein said lid includes said upper surface and depending sides connected thereto and wherein said lid is hingedly connected to said box at the lower end of one of said lid sides and adjoining upper end of one of said box sides.

11. The improved device of claim 1 wherein said socket has at the rear end thereof an upwardly diverging recess to permit easy tilting of said pole while said pole butt is in said socket.

12. The improved device of claim 1 wherein the tackle box and pole holder are combined and manufactured to form a unitary structue.

* * * * *